Jan. 13, 1970   L. A. WRIGHT   3,489,442
PISTON AND ROD ASSEMBLY
Filed Jan. 16, 1969
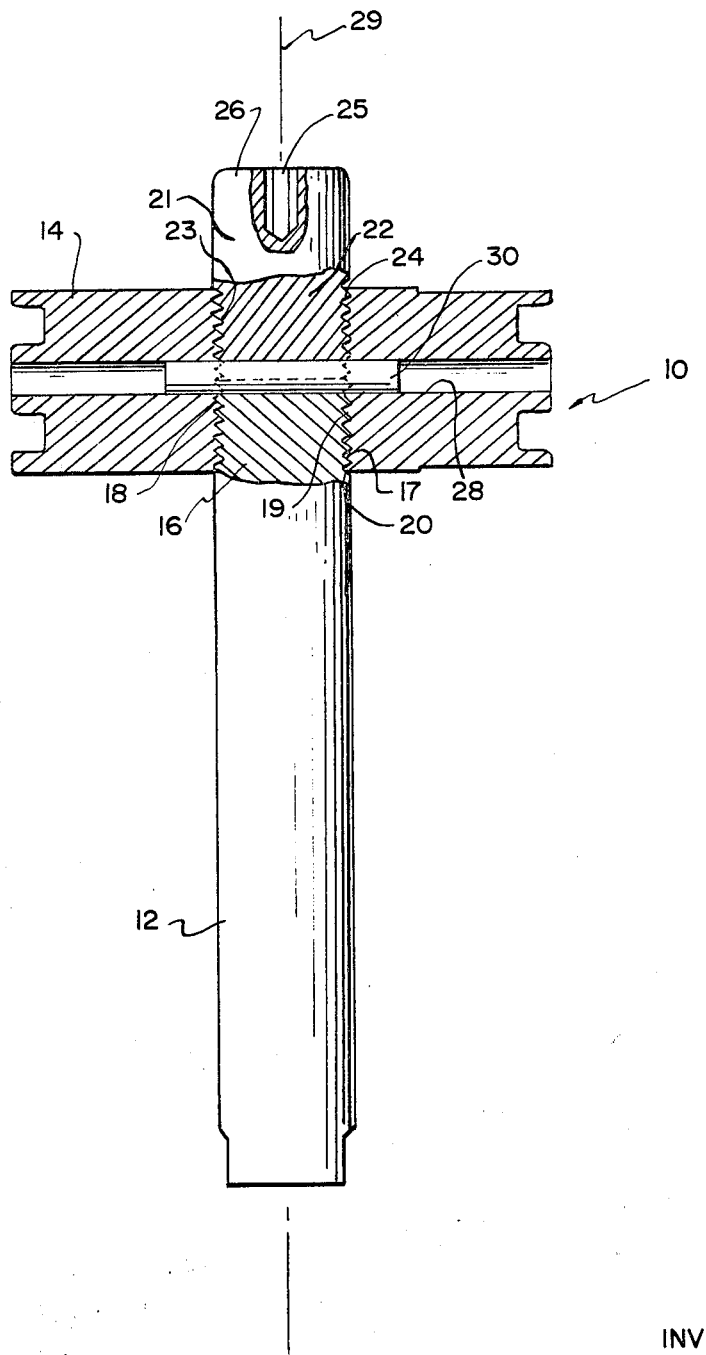
INVENTOR
LEE A. WRIGHT
BY
ATTORNEYS

United States Patent Office 3,489,442
Patented Jan. 13, 1970

3,489,442
PISTON AND ROD ASSEMBLY
Lee A. Wright, Kellering, Ohio, assignor to Compressed
Air Service Company, Moraine, Ohio, a corporation of
Ohio
Filed Jan. 16, 1969, Ser. No. 791,712
Int. Cl. F16b 39/22
U.S. Cl. 287—20                6 Claims

ABSTRACT OF THE DISCLOSURE

A threaded end of a first rod is threaded part way into one end of a threaded axial bore in a piston. A threaded end of a second rod is threaded into the other end of the threaded axial bore until it contacts the threaded end of the first rod. A predetermined torque is applied to one of the rods for urging the ends of the rods into engagement with each other thereby to prestress the threads on the first and second rods against the threads of the threaded axial bore.

SUMMARY OF THE INVENTION

This invention relates to an improved piston and rod assembly and to a novel method for securing a piston to a rod.

Accordingly, one object of the invention is to provide an improved method and means for securing a piston to a rod.

Another object of the invention is to provide an improved method and means for threadedly securing a rod to a piston wherein relative rotational movement between the rod and piston is prevented.

Still another object of the invention is to provide an improved method and means for threadedly securing a piston to a rod wherein the threads of the rod are prestressed against the threads in an axial bore of the piston.

A further object of the invention is to provide a simple and inexpensive method and means for securing a piston to a rod.

A still further object of the invention is to provide an improved method and means for securing a piston to a rod which will hold the piston safely and securely on the rod over a long period of time.

The invention achieves the above and other objects, including those inherent therein, by providing a method for securing a piston to a rod, the method comprising the steps of: fastening a threaded end of a first rod part way into one end of a threaded axial bore in a piston, fastening a thread end of a second rod into the other end of the threaded axial bore until it contacts the threaded end of the first rod, and rotating one of the rods relative to the piston to urge the ends of the rods against each other.

The invention achieves other of its objects by providing a piston and rod assembly comprising a first rod threaded at one end, a piston having a threaded axial bore, the threaded end of the first rod being threadedly received into one end of the axial bore, a second rod having a threaded end threadedly received in the other end of the axial bore and engaging the threaded end of the first rod with a predetermined amount of pressure to prestress the threads of the first and second rods against the threads in the axial bore.

Other objects and advantages of the invention will become apparent from the following description taken in conjunction with the accompanying drawing which is a side elevational view of the piston and rod assembly of this invention with portions broken away.

DESCRIPTION OF A PREFERRED EMBODIMENT OF THE INVENTION

In the drawing, a piston and rod assembly is generally indicated at 10. The assembly 10 is of a type which may be used, by way of example, in a compressed air system wherein air is used to move the piston back and forth. The assembly 10 includes a rod 12, and a piston 14. One end 16, of the rod 12, is threaded as indicated at 17. The threaded end 16 of the rod 12 is received in an axial bore 18 formed in said piston 14, which bore 18 is threaded as indicated at 19. In the illustrated embodiment, the end 16 is received only part way into one end 20 of the axial bore 18.

A short second rod, or rod end 21, has one end 22 threaded as indicated at 23. The threaded end 22 is received in the other end 24 of the axial bore 18. The threaded end 22 of the second rod 21 engages the threaded end 16 of the first rod 12. Preferably the threaded ends 16 and 22 each extend approximately half way into the axial bore 18.

In one embodiment of the invention, means are provided on the second rod by which the second rod can be engaged by a wrenching device to apply a predetermined torque to the second rod 21. In the illustrated embodiment, this means is in the form of a short axial hole or bore 25 in the other end 26 of the second rod 21 opposite the threaded end 22. The hole 25 is of polygonal cross-section and is adapted to receive wrenching means of a similar polygonal configuration, such as an Allen wrench, whereby the second rod 21 can be rotated to apply a predetermined amount of torque on the second rod 21 while the first rod 12 is fixed against rotation. Of course, other means, such as flats, can be provided on the second rod 21 whereby the second rod 21 can be engaged by wrenching means, such as for example, a Crescent wrench or a socket wrench, to place a predetermined amount of torque on the second rod 21 to prestress the threads 17 and 23 on the rods 12 and 21 against the threads 19 in the axial bore 18.

It is to be appreciated, of course, that the prestressing of the threads can be accomplished in other ways. For example, the torque can be applied to the first rod 12 while the second rod 21 is fixed against rotation. Alternatively, both rods 12 and 21 can be rotated so as to screw in the threaded ends 16 and 22 into the axial bore 18 against each other. As a further alternative, the piston 14 can be fixed against rotation while one (or both) of the rods 12 and 21 is (or are) rotated.

With the threads 17, 19 and 23 prestressed, there is very little chance of the piston 14 working itself loose unless the rod end 21 rotates with respect to the first rod 12. To prevent this from happening, a transversely extending hole 28 is formed, e.g. drilled, through the piston 14 at a point where the hole will intercept or intersect the threaded end 16 of the rod 12 and the threaded end 22 of the rod 21. Preferably, the hole 28 also intersects the centerline 29 of the axial bore 18. A pin 30 is then received, e.g. driven, into the hole 28 to prevent rotational movement between the first rod 12 and the second rod 21. It is to be understood, that no shear load is placed upon the pin 30.

In securing the piston to the rod, i.e. in carrying out the method of this invention, the threaded end 16 of the first rod 12 is first fastened part way into the one end 20 of the axial bore 18 in the piston 14. Next, the threaded end 22 of the second rod 21 is fastened into the other end 24 of the axial bore 18 until the threaded end 22 engages or contacts the threaded end 16 of the first rod 12. Then, a predetermined amount of torque is applied to at least one of the rods 12 or 21 to prestress the threads 17 and 23 on rods 12 and 21 against the threads 19 in the axial bore 18.

In a preferred embodiment of the invention, after the torque is applied to at least one of the rods, the hole 28 is drilled transversely through the piston 14 at a point where the hole 28 will intercept both the threaded end 16 of rode 12 and the threaded end 22 of rod 21. Then, the drive pin 30 is driven into the hole 28 to fix the positions of the first and second rods 12 and 21 relative to each other.

The above described method for securing a piston to a rod is very simple to perform. Also, the component parts of the piston and rod assembly are very simple and inexpensive to make. Tests have shown that this assembly will hold up very well in a wide variety of applications.

It will thus be seen, by reference to the foregoing specification and to the appended claims, that the present invention provides a novel method and means for securing a piston to a rod wherein the resulting assembly has a number of advantages and characteristics, including those pointed out herein, and other which are inherent in the invention.

I claim:

1. Piston and rod assembly comprising: a first rod threaded at one end, a piston having a threaded axial bore, said threaded end of said first rod being threadedly received part way into one end of said axial bore, a second rod having a threaded end threadedly received into the other end of said axial bore and engaging said threaded end of said first rod with a predetermined amount of pressure to prestress the threads of said first and second rods against the threads of said axial bore, said piston having a hole extending transversely therethrough, said hole intersecting said threaded ends of said first and second rods, and a pin is received in said transversely extending hole to fix the positions of said first and second rods relative to said piston and thereby prevent relative rotational movement between said first rod and said second rod.

2. Piston and rod assembly according to claim 1 wherein said transversely extending hole intersects the center line of said axial bore.

3. Piston and rod assembly according to claim 1 wherein said pin received in said transversely extending hole engages the threaded ends of said first and second rods to prevent relative rotation between said threaded ends of said first and second rod and between said piston and said first and second rods.

4. A method for securing a piston to a rod comprising the steps of:
(a) fastening a threaded end of a first rod part way into one end of a threaded axial bore in a piston,
(b) fastening a threaded end of a second rod into the other end of said threaded axial bore until it contacts said threaded end of said first rod,
(c) rotating at least one of said rods relative to said piston to urge said ends of said rods against each other thereby to prestress the threads on said first and second rods against the threads in said axial bore,
(d) forming a transverse hole through said piston, said hole passing through part of said threaded end of said first rod and through part of said threaded end of said second rod, and
(e) inserting a pin into said transverse hole to fix the positions of said first and second rods relative to each other and relative to said piston and thereby prevent relative rotational movement between said first rod and said second rod.

5. The method of claim 4 wherein said transverse hole is formed so as to intersect the center line of said axial bore.

6. The method of claim 4 wherein said pin received in said transverse hole engages said threaded end of said first rod and said threaded end of said second rod to prevent relative rotation between said threaded ends of said first and said second rods and between said piston and said first and second rods.

References Cited

UNITED STATES PATENTS

| | | | |
|---|---|---|---|
| 287,311 | 10/1883 | Nunn | 151—14 X |
| 446,521 | 2/1891 | Hundgeburth. | |
| 1,188,876 | 6/1916 | Allen. | |
| 1,372,262 | 3/1921 | Yount | 92—258 X |
| 2,128,116 | 8/1938 | Boone. | |
| 2,497,384 | 2/1950 | Young | 287—125 X |
| 2,758,897 | 8/1956 | Naab. | |
| 2,925,293 | 2/1960 | Voss et al. | 287—53 |

FOREIGN PATENTS

| | | |
|---|---|---|
| 929,852 | 6/1963 | Great Britain. |

DAVID J. WILLIAMOWSKY, Primary Examiner

ANDREW V. KUNDRAT, Assistant Examiner

U.S. Cl. X.R.

29—156.5; 287—53